H. A. MITCHELL, DEC'D.
E. W. LOVE, ADMINISTRATOR.
APPARATUS FOR HEATING AND RIPENING HONEY.
APPLICATION FILED SEPT. 18, 1918.
1,327,166.
Patented Jan. 6, 1920.
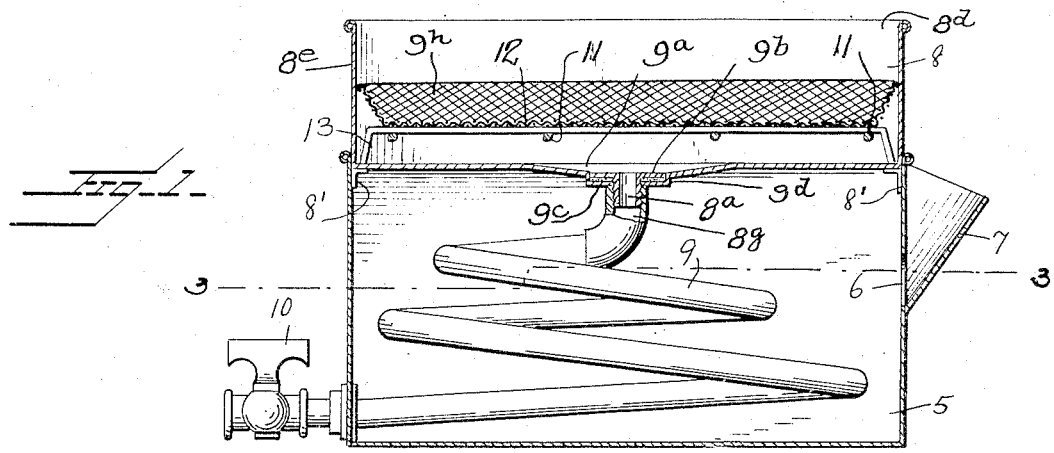
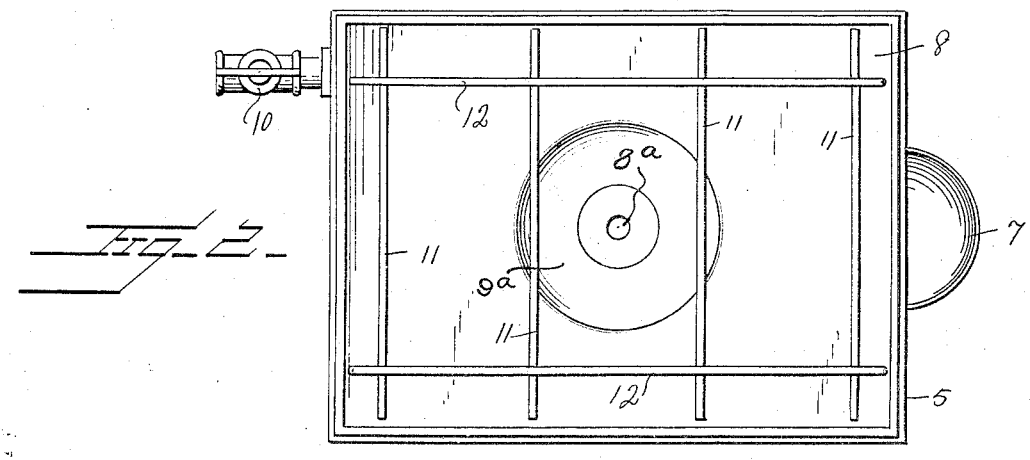
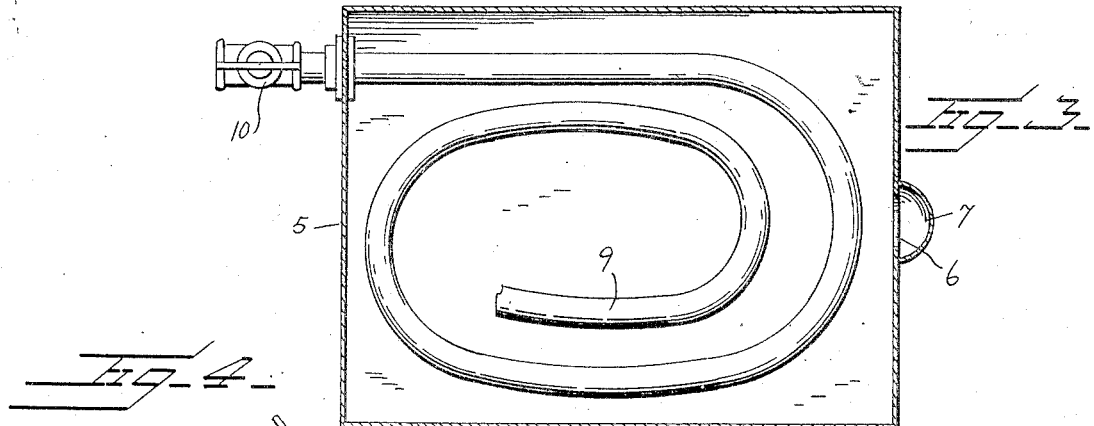
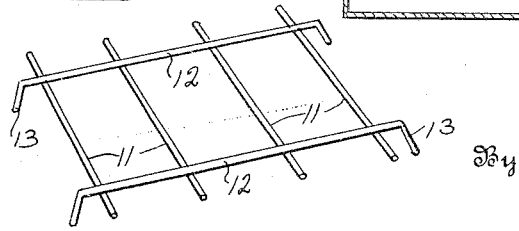
Inventor
H. A. Mitchell
By Watson E. Coleman
Attorney

UNITED STATES PATENT OFFICE.

HENRY A. MITCHELL, OF SHEPHERD, TEXAS; E. W. LOVE, ADMINISTRATOR OF SAID HENRY A. MITCHELL, DECEASED.

APPARATUS FOR HEATING AND RIPENING HONEY.

1,327,166.   Specification of Letters Patent.   Patented Jan. 6, 1920.

Application filed September 18, 1918. Serial No. 254,687.

*To all whom it may concern:*

Be it known that I, HENRY A. MITCHELL, a citizen of the United States, residing at Shepherd, in the county of San Jacinto and State of Texas, have invented certain new and useful Improvements in Apparatus for Heating and Ripening Honey, of which the following is a specification, reference being had to the accompanying drawings.

This invention relates to an apparatus for heating and ripening honey, and has for its primary object to provide a very simple arrangement of the several parts, whereby the ripening process will be greatly expedited.

It is another and more particular object of the invention to provide an apparatus for the above purpose embodying a hot water tank, a pan or receptacle arranged in the upper portion of the tank to receive the honey, and a pipe coil having one of its ends centrally connected to the bottom of said pan and its other end extended through one end wall of the tank.

It is also another object of the invention to provide a removable support adapted to be arranged within the pan and upon which the strainer cloths are supported in spaced relation to the bottom wall of the pan.

It is also a further general object of my invention to provide a device as above characterized, the several parts of which may be manufactured at relatively small cost and can be easily and quickly assembled or disassembled.

With the above and other objects in view, my invention consists in the novel features of construction, combination, and arrangement of parts to be hereinafter more fully described, claimed and illustrated in the accompanying drawing, in which:

Figure 1 is a vertical sectional view illustrating one embodiment of my invention;

Fig. 2 is a top plan view;

Fig. 3 is a section taken on the line 3—3 of Fig. 1;

Fig. 4 is a detail perspective view of the comb support.

Referring in detail to the drawings, 5 designates the hot water tank which is preferably, though not necessarily, of rectangular form and may be of any desired dimensions. This tank is provided in one end wall with an opening indicated at 6 and a pouring spout or funnel 7 by means of which water is directed through the said opening into the tank.

Within the upper portion of the tank 5 a pan 8 is disposed. Preferably spaced supporting lugs 8' are fixed to the end walls of the tank upon which said pan is supported. One end of a pipe coil 9 in the hot water tank is centrally connected to the bottom wall of the pan 8 while the other end of said coil extends through the opposite end wall of the tank to that which is provided with the water inlet opening and is equipped with a faucet 10. The pan 8 is provided with side and end flanges $8^d$ and $8^e$, which act to retain the support in place and also act as a guard for the honey.

11 designates the spaced transverse wires of the strainer cloths support which are connected to each other at their ends by means of the longitudinal wires 12, the latter wires having their terminals angularly bent as at 13 to form supporting feet. This support is adapted to be arranged within the pan 8, the feet 13 engaging the bottom wall of the pan so that the transverse wires 11 are disposed in spaced relation thereto.

In the use of the apparatus, after filling the tank 5 with water and placing the honey upon the support within the pan 8, the tank is arranged over a stove burner or other source of heat. The water in the tank is quickly heated to a very high degree, and the honey from the combs is strained through the strainer cloth $9^h$. This strainer cloth is arranged upon the support 12, and may be constructed of any suitable material, and has its marginal edge portion up-turned adjacent the side and end pieces $8^d$ and $8^e$ of the pan. The honey after straining through the cloth drips upon the bottom of the pan 8, where it becomes heated to a liquid state, so as to enter the pipe coil 9. In the passage of the honey through the pipe 9, it is highly heated and ripened. The ripened honey is drawn off from the coil by means of the valve or faucet 10. As the water in the tank 5 is consumed, the supply may be replenished through the opening 6 in the end wall of the tank.

It is to be observed that the pan 8 corresponds in shape and telescopically fits into the tank, so that the heat arising from the water in the tank will act upon the full area of the bottom of the pan, a very small amount of the heat from the water being allowed to escape between the sides of the pan and the tank, but not enough to lessen the heating propensities. Furthermore, this escaping heat is gradual, and since the bottom of the pan is conical, the heat is deflected or distributed the full area of the bottom of the pan. It is obvious that the skeleton support 12 (upon which the straining means is arranged) supports the honeycomb. By reason of the fact that the heat from the water in the tank spreads upon the underface of the bottom of the pan, there is a considerable amount of heat that radiates upwardly from the bottom of the pan, and it is imparted to the honeycomb, thereby preheating the honeycomb, so as to preripen the honey, and reduce it to a running liquid state, so that it may thoroughly strain through the straining means, and upon the bottom of the pan, where it is subsequently heated. The pre-heating and pre-ripening the honey before it reaches the bottom of the pan, allows it to be easily carried off by the coil. Obviously the honey in passing through the coil becomes thoroughly heated and ripened from the heat of the water in the tank, particularly owing to the coil being of small area in cross-section. By rendering the pan detachably connected to the coil, it is obvious that the pan may be easily and quickly removed, whereby the coil may be removed for repairs or whereby the bottom of the tank may be cleaned, and the sediment that may collect therein be removed. By constructing the pan so that it will telescopically fit the tank, the most of the heat from the water will act upon the bottom of the tank.

From the foregoing description, taken in connection with the accompanying drawing, the construction, manner of use, and several advantages of my invention will be clearly understood. The upper end of the pipe coil 9 is preferably detachably connected to the bottom wall of the pan. For instance, the bottom of the pan has a central depression 9ª, which is conical. The central portion of this depression is counter-sunk or dished, and engaging in this counter-sunk portion is a flange 9ᵇ of a sleeve 8ª. This sleeve extends through an opening in the bottom of the counter-sunk portion and is threaded into an elbow 8ᵍ. A suitable washer or gasket 9ᵈ is arranged in the counter-sunk portion 9ᶜ, under the flange 9ᵇ. It is to be noted that the portion of the bottom of the counter-sunk portion 9ᶜ and the gasket 9ᵈ are clamped between the flange 9ᵇ and the elbow 8ᵍ, thereby affording a detachable as well as a tight joint. By virtue of the depression 9ª, the flow of the honey into the coil 9 is materially facilitated. By means of the detachable connection of the coil to the bottom of the pan, enables the pan to be disconnected from the coil, so that the pan may be easily removed from the tank for cleaning the interior of the tank, as well as for repairs. The tank and pan are preferably constructed of sheet metal and as the other parts are of very simple form, it will be appreciated that the complete device can be produced at relatively small manufacturing cost. It is also very serviceable and efficient in practical use.

While I have herein shown and described the preferred construction and arrangement of the several elements, it is, of course, to be understood that the apparatus is susceptible of considerable modification and I, therefore, reserve the privilege of adopting all such legitimate changes as may be fairly embodied within the spirit and scope of the invention as claimed.

I claim:—

In an apparatus for heating and ripening honey, the combination with a hot water tank, of a carrying-off and discharging coil mounted therein and provided with a faucet controlled discharging means at one end exterior of the tank, a pan corresponding in shape to and telescopically fitting the tank, and provided with side and end parts, means upon the walls of the tank for supporting said pan removably and telescopically in the tank, a skeleton honeycomb support removably disposed in the pan and conforming thereto, straining means on the support on which the honeycomb rests, the bottom of said pan having a central conical depression, the center of which having an outlet opening, and means for detachably connecting the other end of the coil in said opening, whereby the pan may be removed.

In testimony whereof I hereunto affix my signature in the presence of two witnesses.

HENRY A. MITCHELL.

Witnesses:
J. C. FAIN,
E. C. DIAMOND.